US012146505B2

(12) United States Patent
Schübeler

(10) Patent No.: US 12,146,505 B2
(45) Date of Patent: Nov. 19, 2024

(54) IMPELLER MACHINE AND METHOD FOR MOUNTING AN IMPELLER MACHINE

(71) Applicant: mdGroup Germany GmbH, Siegen (DE)

(72) Inventor: Daniel Schübeler, Delbrück (DE)

(73) Assignee: MDGROUP Germany GmbH, Siegen (DE)

( * ) Notice: Subject to any disclaimer, the term of this patent is extended or adjusted under 35 U.S.C. 154(b) by 0 days.

(21) Appl. No.: 18/247,847

(22) PCT Filed: Oct. 5, 2021

(86) PCT No.: PCT/EP2021/077395
§ 371 (c)(1),
(2) Date: Apr. 4, 2023

(87) PCT Pub. No.: WO2022/073977
PCT Pub. Date: Apr. 14, 2022

(65) Prior Publication Data
US 2023/0400039 A1   Dec. 14, 2023

(30) Foreign Application Priority Data
Oct. 6, 2020 (EP) .................................... 20200236

(51) Int. Cl.
F04D 29/54 (2006.01)
F04D 19/00 (2006.01)
F04D 25/06 (2006.01)

(52) U.S. Cl.
CPC ......... *F04D 29/542* (2013.01); *F04D 19/002* (2013.01); *F04D 25/0606* (2013.01); *F04D 25/0693* (2013.01)

(58) Field of Classification Search
CPC ............... F04D 19/002; F04D 25/0606; F04D 25/0693; F04D 29/542
See application file for complete search history.

(56) References Cited

U.S. PATENT DOCUMENTS 3,969,805 A    7/1976 Lievens et al.
6,554,230 B1 *  4/2003 Horski ................. F04D 29/582
                                                    310/71

(Continued)

FOREIGN PATENT DOCUMENTS

DE   202008002356 U1   6/2009
DE   202019101705 U1   4/2019
EP        0459497 A2   12/1991

OTHER PUBLICATIONS

Epple et al., "A theoretical derivation of the Cordier diagram for turbomachines", Proceedings of the Institution of Mechanical Engineers, Part C: Journal of Mechanical Engineering Science 2011 225: 354, DOI: 10.1243/09544062JMES2285, 16 pgs.

(Continued)

*Primary Examiner* — Sang K Kim
(74) *Attorney, Agent, or Firm* — Alix, Yale & Ristas, LLP

(57) ABSTRACT

The invention relates to an impeller machine comprising an impeller housing (15) and a motor housing (19), wherein the motor housing (19) is arranged in an interior of the impeller housing (15). An aerostator (20) forms a connection between the impeller housing (15) and the motor housing (19). A cable (26, 30) extends between the impeller housing (15) and the motor housing (19). The aerostator (20) comprises an aerostator body (34) and an aerostator cover (35) which together span a contour in the form of a wing profile. The cable (26, 30) is guided in a cavity (32) which is arranged between the aerostator body (34) and the aerostator cover (35). The invention also relates to a method for mounting an impeller machine.

12 Claims, 4 Drawing Sheets

(56) References Cited

U.S. PATENT DOCUMENTS

| | | | |
|---|---|---|---|
| 6,561,762 B1* | 5/2003 | Horng | F04D 29/544 |
| | | | 415/220 |
| 8,992,175 B2 | 3/2015 | Heli et al. | |
| 11,572,883 B2* | 2/2023 | Yamazaki | F04D 29/661 |
| 2007/0099459 A1 | 5/2007 | Otsuki et al. | |
| 2008/0100160 A1* | 5/2008 | Shibuya | F04D 25/0693 |
| | | | 310/67 R |
| 2008/0219836 A1 | 9/2008 | Decker et al. | |
| 2014/0241920 A1 | 8/2014 | Brownell | |
| 2018/0023578 A1* | 1/2018 | Burtch | F04D 25/0693 |
| | | | 417/423.7 |
| 2018/0252223 A1 | 9/2018 | Yamasaki et al. | |

OTHER PUBLICATIONS

International Preliminary Report on Patentability Application No. PCT/EP2021/077395 filed on Oct. 5, 2021, Date of Mailing: Apr. 20, 2023; 7 pgs.

Extended European Search Report for Application No. 20200236.6-1201 filed Oct. 6, 2020, Date of Mailing: Mar. 15, 2021, 8pgs.

PCT International Search Report and Written Opinion for International Application No. PCT/EP2021/077395 filed on Oct. 5, 2021, Date of Mailing: Nov. 12, 2021; 12 pgs.

\* cited by examiner

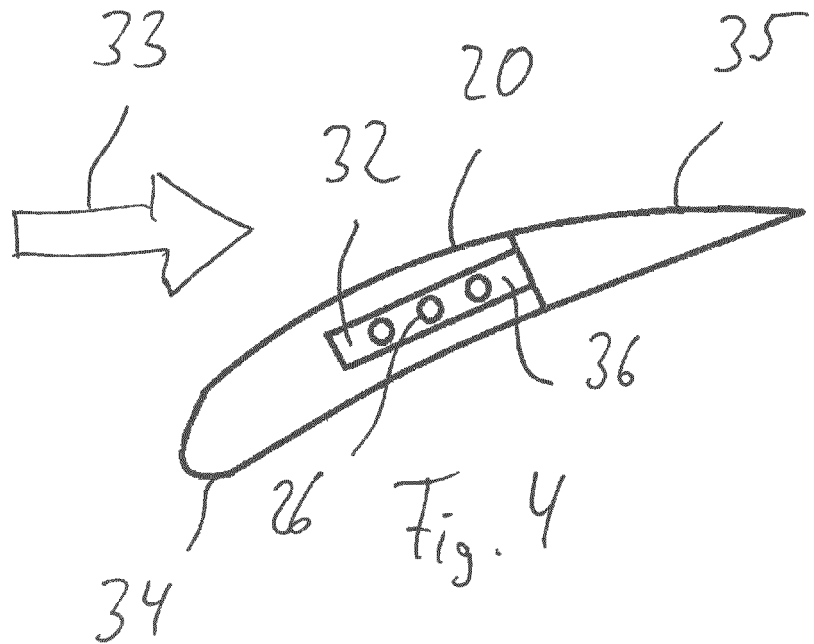
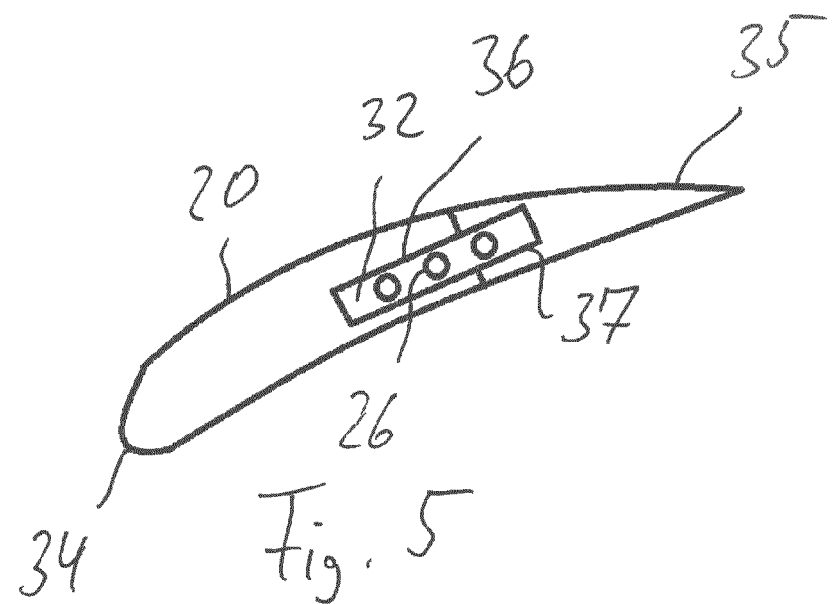

IMPELLER MACHINE AND METHOD FOR MOUNTING AN IMPELLER MACHINE

BACKGROUND

The invention concerns an impeller machine with an impeller housing and a motor housing. The motor housing is arranged in an interior of the impeller housing. An aerostator forms a connection between the impeller housing and the motor housing. The invention also concerns a method for mounting an impeller machine.

Impeller machines generate an air flow which extends along an annular space enclosed between the impeller housing and the motor housing. In order to supply electrical energy to the motor arranged in the motor housing, or to transmit sensor data from the motor to the outside, cables are required which are guided radially outward from the motor housing. The cables cross the annular space in which the air flow is conducted. The problem arises of guiding the cables so as not to disrupt the air flow.

It is known to form a channel in the interior of the aerostator, inside which the cable is guided. This leads to a high cost for mounting the impeller machine. In parallel with inserting the motor, the cable must be threaded into the channel and conducted through the channel in the longitudinal direction.

SUMMARY

The invention is based on the object of proposing an impeller machine and a method for mounting an impeller machine in which the mounting complexity is reduced. Starting from the cited prior art, the object is achieved with the features of the independent claims. Advantageous embodiments are indicated in the dependent claims.

In the impeller machine according to the invention, a cable extends between the impeller housing and the motor housing. The aerostator comprises an aerostator body and an aerostator cover. The cable is guided in a cavity which is arranged between the aerostator body and the aerostator cover.

The invention has found that in this way, the impeller machine can be mounted considerably more easily. On insertion of the motor into the motor housing, the cable is laid such that it extends through the annular space, along the aerostator via which the motor housing is held relative to the impeller housing. On application of the aerostator cover, the free access to the cable channel is covered so that the cable is arranged in a cavity.

An impeller machine in the sense of the invention is an axial flow turbomachine. The air flow driven by the aerorotor has a flow direction which is parallel to the axis of the aerorotor. The aerorotor has rotor blades which, relative to the axis, are arranged in the same radial portion as the annular space between the impeller housing and the motor housing.

The difference between impeller machines and other types of turbomachines is evident from the Cordier diagram shown in FIG. 9, in which the speed number $\sigma$ is shown over the diameter number $\delta$. The impeller machines according to the invention differ from radial and diagonal flow turbomachines by a higher value for the speed number $\sigma$ and a lower value for the diameter number $\delta$. The impeller machines according to the invention differ from propeller machines without casing by a lower value for the speed number $\alpha$ and a higher value for the diameter number $\delta$. The speed number $\sigma$ of the impeller machine according to the invention may lie between 1.8 and 10. The diameter number $\delta$ may lie between 0.8 and 1.5.

The speed number $\sigma$ used in the Cordier diagram is a dimensionless characteristic number which is defined as follows:

$$\sigma = 2\sqrt{\pi}\,n\frac{\sqrt{Q}}{(2Y)^{3/2}}$$

The diameter number $\delta$ is also a dimensionless characteristic number which is defined as follows:

$$\delta = \frac{\sqrt{\pi}}{2}D\sqrt[4]{\frac{2Y}{Q^2}}$$

Both formulas take account of the volume flow Q and the specific head Y. If these two variables are considered to be predefined by the proposed use of the turbomachine, the speed number $\sigma$ depends only on the rotation speed n and the diameter number $\delta$ depends only on the diameter D of the aerorotor. Further explanations are given in Epple et al., A theoretical derivation of the Cordier diagram for turbomachines, Proceedings of the Institution of Mechanical Engineers, Part C: Journal of Mechanical Engineering Science 2011 225: 354.

In the fully mounted state of the impeller machine, an electrically driven motor may be arranged in the interior of the motor housing. The motor may drive a motor shaft which extends in the axial direction of the impeller machine. An aerorotor, which is set in rotation by the motor shaft, may be connected to the motor shaft. The aerorotor may comprise rotor blades which extend substantially outward in the radial direction. The rotor blades may be arranged and dimensioned such that they sweep the radial portion which is spanned by the annular space between the impeller housing and the motor housing.

The annular space enclosed between the impeller housing and the motor housing may comprise a portion with constant cross-section. The portion may extend over at least 50%, preferably at least 70%, further preferably at least 80% of the axial length of the annular space. "Constant cross-section" means that the distance between the inside of the impeller housing and the outside of the motor housing is constant, and that the outer diameter and inner diameter of the annular space are constant. Aerostators and/or cooling structures inside the annular space do not constitute changes in cross-section in this sense. The aerorotor may have rotor blades which, viewed in the radial direction of the impeller machine, cover the constant cross-section of the annular space.

The aerorotor may be arranged in an upstream portion of the annular space, so that the air flow driven by the aerorotor first passes through the aerorotor and then through the longer portion of the annular space. The upstream end of the impeller machine is known as the front end, and the downstream end of the impeller machine is known as the rear end. The impeller housing may form a closed envelope which extends circumferentially around the annular space. An upstream portion of the impeller housing may be arranged radially outside the aerorotor.

The impeller machine may comprise a plurality of aerostators which extend between the impeller housing and the motor housing and together hold the motor housing relative to the impeller housing. The plurality of aerostators may be arranged in the same axial position. The positions of the aerostators may be evenly distributed over the circumference of the impeller machine. For example, three aerostators may be distributed over the circumference of the impeller machine. The aerostators may have an aerofoil profile in order to conduct and straighten the air flow generated by the aerorotor. The air may flow around the aerofoil profile in the annular space so that the air flow hits a front face of the aerofoil profile and is divided between a suction side and a pressure side of the aerofoil profile. The air flow coming from the suction side and that coming from the pressure side may combine again behind the aerostator.

The annular space may have an axial extent which extends from the plane of the aerorotor to a downstream end of the impeller housing. The rear ends of the aerostators may protrude rearwards beyond the impeller housing. A front portion of the aerostator may be arranged in the interior of the impeller housing. The cavity inside which the cable extends may be arranged in the interior of the impeller housing. The cavity may be open towards the outside through the impeller housing. The cavity may be open towards the inside through the motor housing.

The cable guided in the cavity may have a first end which is arranged radially inside the motor housing. The cable may have a second end which is arranged radially outside the impeller housing. The cables may comprise supply cables via which electrical energy is supplied to the motor of the impeller machine. In particular, three supply cables may be provided which are connected to the three phases of the motor. A battery to which the supply cables are connected may be arranged radially outside the impeller housing.

The cables may include sensor cables which are connected to sensors arranged in the motor housing. The sensors may for example be configured to measure the rotation speed of the motor or the temperature. The sensors may comprise a Hall sensor and/or an IMU (inertial measurement unit). Via the sensor cables, the obtained measurement data may be conducted to a control unit arranged radially outside the impeller housing.

The motor may be a motor-stator connected to the motor housing and have a magnetic rotor connected to the aerorotor. The first end of the cable may be connected in a downstream portion of the motor, so that the motor-stator and magnetic rotor are arranged between the aerorotor and the first end of the cable relative to the axial direction. This may apply to all cables connected to the motor.

The impeller machine may be configured such that a single cable is arranged in the cavity of the aerostator. Three supply cables from the motor may be conducted to the outside in that each supply cable is arranged in the cavity of a different aerostator.

It is also possible that a plurality of cables is conducted in the cavity of an individual aerostator. For example, all supply cables of the motor may be arranged inside one aerostator, which offers advantages for electromagnetic compatibility. Additional sensor cables may be conducted inside the same aerostator or inside another aerostator. It is also advantageous for electromagnetic compatibility if the aerostator is equipped with an electromagnetic shielding surrounding the cable.

An aerostator in which a cable is guided comprises an aerostator body, via which mechanical forces are transmitted between the impeller housing and the motor housing, and an aerostator cover which covers the cavity. The aerostator may be configured such that mechanical loads are carried solely by the aerostator body, while the aerostator cover has only a covering function. It is also possible that both the aerostator cover and the aerostator body have a load-bearing function.

A recess may be formed in the aerostator body for receiving the cable. The recess may extend over the length of the aerostator body from the motor housing up to the impeller housing. The recess may be dimensioned in cross-section such that the cable or cables conducted in the aerostator are fully received in the recess. Then an aerostator cover may be used which lies flat on the aerostator body, in order to close the recess and form the cavity in which the cables are guided. It is also possible that the cavity is arranged partly or completely inside a part of the contour of the aerostator which is formed by the aerostator cover.

The recess may be open towards the rear end of the aerostator body. This is advantageous for easier mounting of the impeller machine, because the cables can be laid in the recesses at the same time as the motor is inserted in the motor housing. The cables may be fixed in the recess of the aerostator body by adhesive.

The aerostator cover may be configured such that the cavity is covered over the entire length of the aerostator between the motor housing and the impeller housing. In particular, the aerostator cover may be configured such that the cavity is completely closed, i.e. the cables in the cavity are not visible from the outside.

The aerostator cover may be detachably connected to the aerostator body, for example in that the aerostator cover is screwed to the aerostator body or connected to the aerostator body via a catch connection. A connection between the aerostator cover and the aerostator body which cannot be separated without destruction is also possible, for example in that the aerostator cover is glued or welded to the aerostator body.

The aerostator body and aerostator cover may together span a contour of the aerostator which has the form of an aerofoil profile. The transition between the surface of the aerostator body and the surface of the aerostator cover may be smooth so that the air flow is disrupted as little as possible.

The impeller machine according to the invention may comprise a cover component, in that the aerostator cover for a first aerostator body and the aerostator cover for a second aerostator body are combined into a unitary component. Then on mounting of the impeller machine, for a plurality of aerostators, only a single part need be connected to the impeller machine in order to complete the contour. If several aerostators have cavities with cables arranged therein, the cavities are closed in a single mounting step.

The cover component may have a central portion which forms a cover for the downstream rear end of the motor. The surface of the cover component may form a smooth transition to the surface of the motor housing, so that the air flow is disrupted as little as possible. The cover component may run out towards the rear in a rounded form, the peak of which coincides with the axis of the impeller machine. The cover component may be provided with an inlet opening for a cooling air channel. The inlet opening may in particular be arranged in the central portion of the cover component.

The invention also concerns a method for mounting an impeller machine. In the method, a motor is inserted in a motor housing. A cable is arranged along the aerostator body, wherein the aerostator body connects the motor housing to an impeller housing. An aerostator cover is attached so that the cable is arranged in a cavity between the aerostator cover and the aerostator body.

In a preferred embodiment, the cable is arranged in a common working step with the insertion of the motor. However, other temporal sequences of the two working steps are also possible. The cable may be attached to the aerostator body with adhesive before application of the aerostator cover. An aerostator may be connected to the motor after insertion of the motor. The aerorotor may be conducted to the impeller housing in the opposite direction to the motor.

The method may be refined with further steps which are described in connection with the impeller machine according to the invention. The impeller machine may be refined with further features which are described in connection with the method according to the invention.

BRIEF DESCRIPTION OF THE DRAWINGS

The invention is now described as an example with reference to the appended drawings showing advantageous embodiments. In the drawings:

FIG. 4: shows a section through an aerostator of an impeller machine according to the invention;

FIG. 5: shows the view from FIG. 4 in an alternative embodiment of the invention;

DETAILED DESCRIPTION

Figure 1:
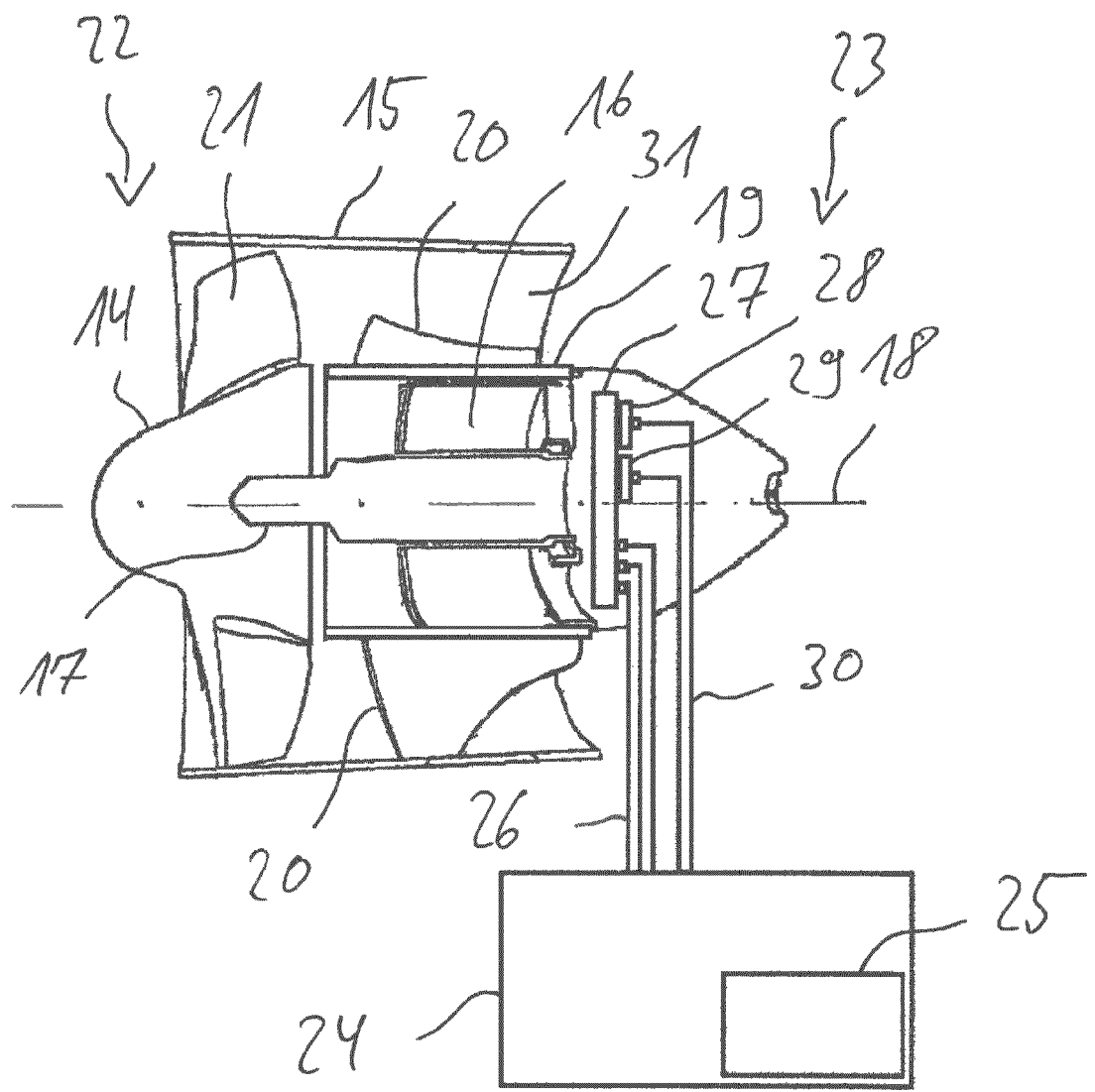
FIG. 1: shows a schematic illustration of an impeller according to the invention.

An impeller machine according to the invention as shown in FIG. 1 comprises an aerorotor 14 which is arranged in an impeller housing 15. An electromotor 16 drives a shaft 17, so that the aerorotor 14 connected to the shaft 17 is set in rotation. The shaft 17 extends along a central axis 18 of the impeller machine. The motor 16 is held in a motor housing 19 which is arranged in the interior of the impeller housing 15.

Figure 6:
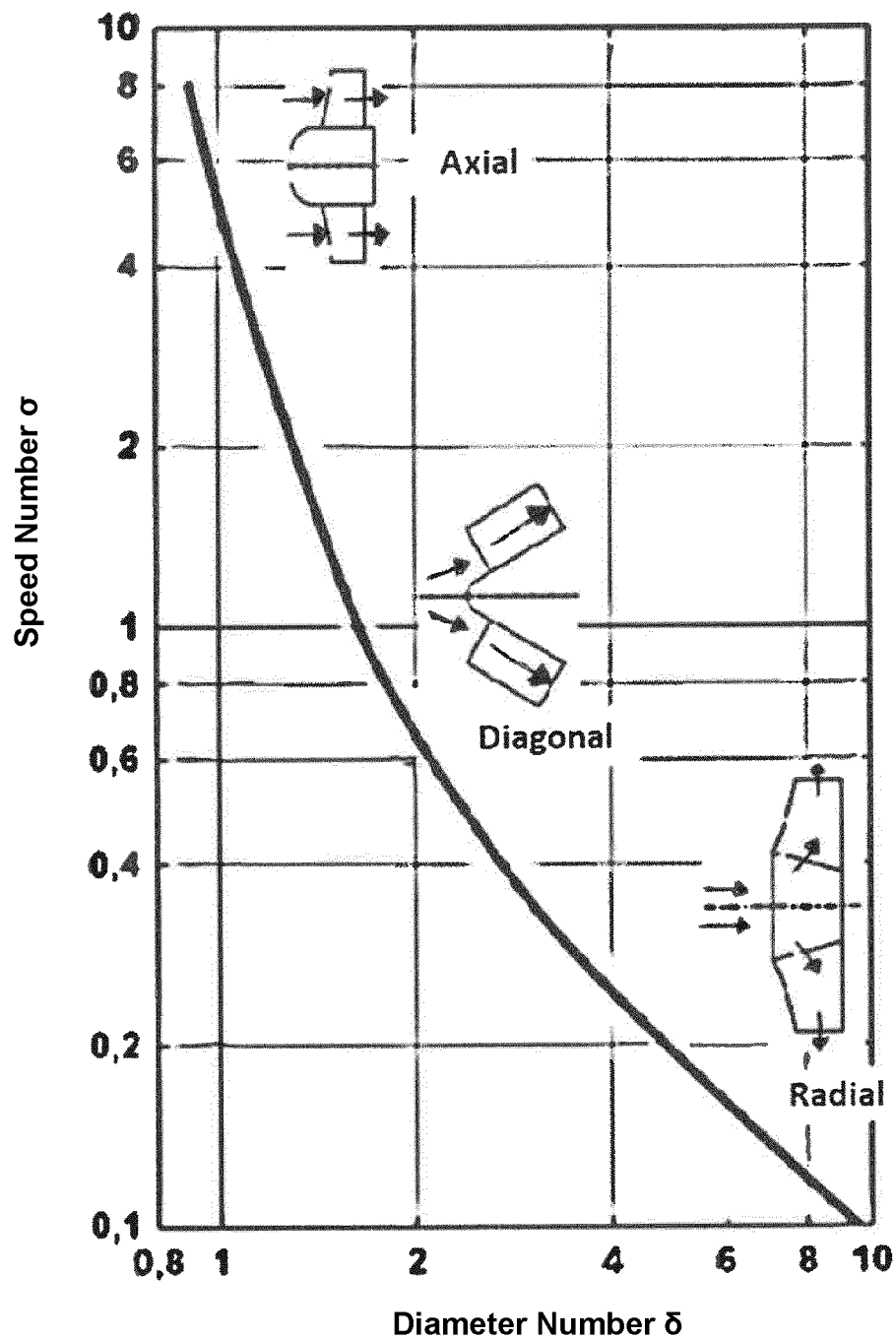
FIG. 6: shows a Cordier diagram to distinguish different types of turbomachine.

An impeller machine in the sense of the invention is an axial flow turbomachine with high efficiency which, in the Cordier diagram (FIG. 6), has a speed number σ between 1.8 and 10, and a diameter number δ between 0.8 and 1.5. The impeller machine according to the invention differs from diagonal and radial flow turbomachines with high efficiency by a higher value for the speed number σ and a lower value for the diameter number δ. The impeller machine according to the invention differs from propeller machines without casing by a lower value for the speed number σ and a higher value for the diameter number δ.

A plurality of aerostators 20 is formed in an annular space 31 which is enclosed radially outside the motor housing 19 and radially inside the impeller housing 15, wherein the aerostators hold the motor housing 19 in position relative to the impeller housing 15. The aerorotor 14 comprises a plurality of rotor blades 21 which run around the front end of the annular space 31. Rotation of the aerorotor 14 generates an air flow which extends from the aerorotor 14 through the annular space 31 to the opposite end of the impeller machine. The upstream part is known as the front end 22 and the downstream part as the rear end 23 of the impeller machine.

The impeller machine is actuated by a control unit 24. The control unit comprises a battery 25 which supplies electrical energy to the electric motor 16. To transmit the electrical energy from the battery 25 to the electric motor 16, three supply cables 26 are provided which supply the three poles of the electric motor 16. The supply cables 26 extend from the control unit 24 to a control circuit board 27 which is arranged at the rear end 23 of the motor housing 19.

A temperature sensor 28 and a rotation speed sensor 29 are also arranged on the control circuit board 27. Two sensor cables 30 extend between the sensors 28, 29 and the control unit 24.

Figure 2:
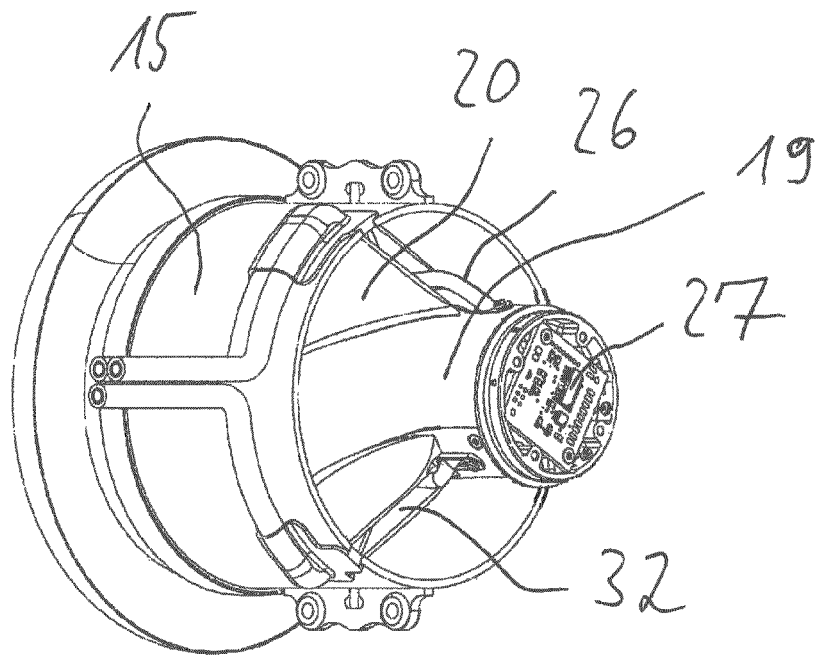
FIG. 2: shows an impeller machine according to the invention in an intermediate state during mounting.

The control unit 24 is arranged radially outside the impeller housing 15. The supply cables 26 and sensor cables 30 cross the radial portion in which the annular space 31 is formed and in which the air flow driven by the aerorotor 14 is conducted. The supply cables 26 and sensor cables 30 should be arranged so that they do not disrupt the air flow. According to FIGS. 2 and 3, this is achieved in that at least one aerostator 20 is provided with a cavity 32 in its interior, in which the cables 26, 30 are conducted.

FIG. 4 shows a section through an aerostator 20 in the axial direction of the impeller machine, wherein the direction of air flow is indicated with an arrow 33. The aerofoil profile of the aerostator 20 is formed by an aerostator body 34 and an aerostator cover 35. The aerostator cover 35 adjoins the rear end of the aerostator body 34 and continues the profile spanned by the aerostator body 34 with a smooth transition towards the rear.

The aerostator body 34 has a supporting function in that the aerostator body 34 transmits forces between the impeller housing 15 and the motor housing 19, and holds the motor housing 19 in position relative to the impeller housing 15. In the embodiment shown, the aerostator cover 35 has no supporting function. The invention also includes alternative embodiments in which the aerostator body 34 and aerostator cover 35 together transmit force between the impeller housing 15 and the motor housing 19.

At the rear end of the aerostator body 34, a recess 36 is formed which extends over the entire length of the aerostator 20 from the motor housing 19 to the impeller housing 15. The recess 36 is open towards the outside through the impeller housing 15 and open towards the inside through the motor housing 19. In cross-section, as shown in FIG. 4, the recess 36 is dimensioned such that there is room for three supply cables 26 next to one another in the recess 36. The front end of the aerostator cover 35 may lie flat on the rear end of the aerostator body 34 so that the recess 36 is closed into a cavity 32 which is covered all around.

In the alternative embodiment in FIG. 5, the aerostator cover 35 also has a recess 37 at its front end, so that the cavity 32 is composed of the recess 36 of the aerostator body 34 and the recess 37 of the aerostator cover 35. The sensor cables 30 are laid in a corresponding cavity 32 of a second aerostator 20.

Figure 3:
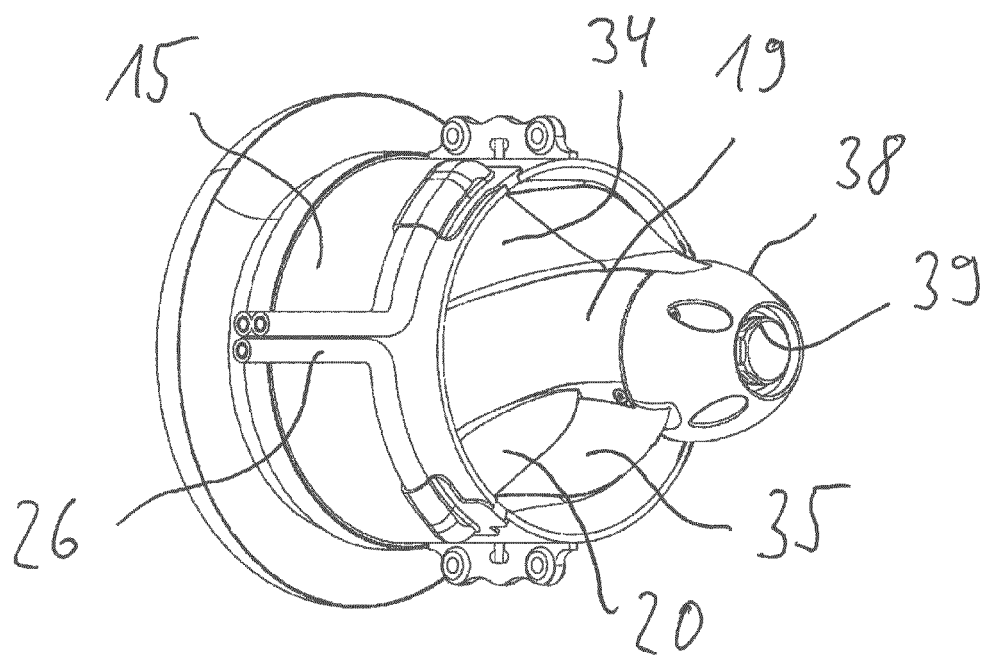
FIG. 3: shows the impeller machine from FIG. 2 in fully mounted state.

According to FIG. 3, the aerostator cover 35 of the aerostator 20 is an element of an integral cover component 38. The cover component 38 comprises a central portion which runs out in rounded form towards the rear. The central portion of the cover component 38 also covers the control circuit board 27 towards the rear.

The three aerostator covers 35 for the aerostators 20 extend radially outward from the central portion. The central portion of the cover component 38 is provided with four bores which are distributed over the circumference and via which the cover component 38 is screwed to the motor housing 19.

At the rear end of its central portion, the cover component 38 is provided with an inlet opening 39 of a ventilation channel. The ventilation channel extends from the inlet opening 39 through the electric motor 16 to the annular space 31.

For mounting the impeller machine according to the invention, the impeller housing 15 and motor housing 19 connected thereto via the aerostators 20 are provided as a unitary component. The motor housing 19 has a specific space in its interior for receiving the electric motor 16. The electric motor 16 with the three supply cables 26, the control circuit board 27 and the sensor cables 30 is brought up to the motor housing 19 from the rear and inserted in the motor housing 19. On insertion, the supply cables 26 are inserted in the recesses 36, accessible from the rear, of a first aerostator 20, and the sensor cables 30 are inserted in the recesses 36, accessible from the rear, of a second aerostator 20. The supply cables 26 and sensor cables 30 are fixed in position with adhesive.

When the electric motor 16 has reached its definitive position in the motor housing 19 and lies against a stop of the motor housing 19, the aerorotor 14 is placed on the shaft 17 of the electric motor 16 from the front and screwed to the shaft 17.

Then the cover component 38 is placed on the motor housing 19 from the rear and screwed to the motor housing 19. With this step, at the same time, the recesses 36 of the aerostators 20 are closed so that the supply cables 26 and sensor cables 30 are arranged in a cavity 32 which is closed all round. The ends of the cables 26, 32 protruding outwardly beyond the impeller housing 15 can be connected to the control unit 20.

The invention claimed is:

1. An impeller machine with an impeller housing (15) and a motor housing (19), wherein the motor housing (19) is arranged in an interior of the impeller housing (15), with a plurality of aerostators (20) which form a connection between the impeller housing (15) and the motor housing (19), and with a cable (26, 30) which extends between the impeller housing (15) and the motor housing (19), wherein each of the plurality of aerostators (20) comprises an aerostator body (34) and an aerostator cover (35), wherein the aerostator body (34) and the aerostator cover (35) together span a contour in the form of an aerofoil profile, and wherein the cable (26, 30) is guided in a cavity (32) which is arranged between the aerostator body (34) and the aerostator cover (35) of at least one of the plurality of aerostators,
said impeller machine comprising a cover component (38), in which the aerostator cover (35) for a first aerostator body (34) and the aerostator cover (35) for a second aerostator body (34) are combined into a unitary component.

2. The impeller machine of claim 1, wherein the plurality of aerostators (20) extend between the impeller housing (15) and the motor housing (19).

3. The impeller machine of claim 1, wherein the cavity (32) is open towards the outside through the impeller housing (15).

4. The impeller machine of claim 1, wherein the cavity (32) is open towards the inside through the motor housing (19).

5. The impeller machine of claim 1, wherein the cable (26, 30) has a first end which is arranged radially inside the motor housing (19), and a second end which is arranged radially outside the impeller housing (15).

6. The impeller machine of claim 1, wherein a recess (36) is formed in the aerostator body (34) for receiving the cable (26, 30).

7. The impeller machine of claim 6, wherein the recess (36) is open towards the rear end of the aerostator body (34).

8. The impeller machine of claim 1, wherein the aerostator cover (35) is detachably connected to the aerostator body (34).

9. The impeller machine of claim 1, wherein the cover component (38) has a central portion which forms a cover for the rear end of the motor housing (19).

10. A method for mounting an impeller machine with the following steps:
   a. inserting a motor (16) in a motor housing (19);
   b. connecting the motor housing (19) to an impeller housing (15) with a plurality of aerostator bodies (34);
   c. arranging a cable (26, 30) along at least one aerostator body (34);
   d. attaching an aerostator cover (35) to each of the aerostator bodies (34) wherein the aerostator body (34) and the aerostator cover (35) together span a contour in the form of an aerofoil profile, so that the cable (26, 30) is arranged in a cavity (32) between the aerostator cover (35) and the aerostator body (34) of the at least one aerostator body (34); and
   e. combining a first aerostator cover (35) and a second aerostator cover (35) with a cover component (38) to form a unitary component.

11. The method of claim 10, wherein an aerorotor (14) is connected to the motor (16).

12. The method of claim 10, comprising:
   f. configuring the unitary cover component (38) to have a central portion which forms a cover for the rear end of the motor housing (19).

* * * * *